March 2, 1926.
E. R. WHARTON
WATERPROOF GAITER
Filed July 2, 1925
1,574,773
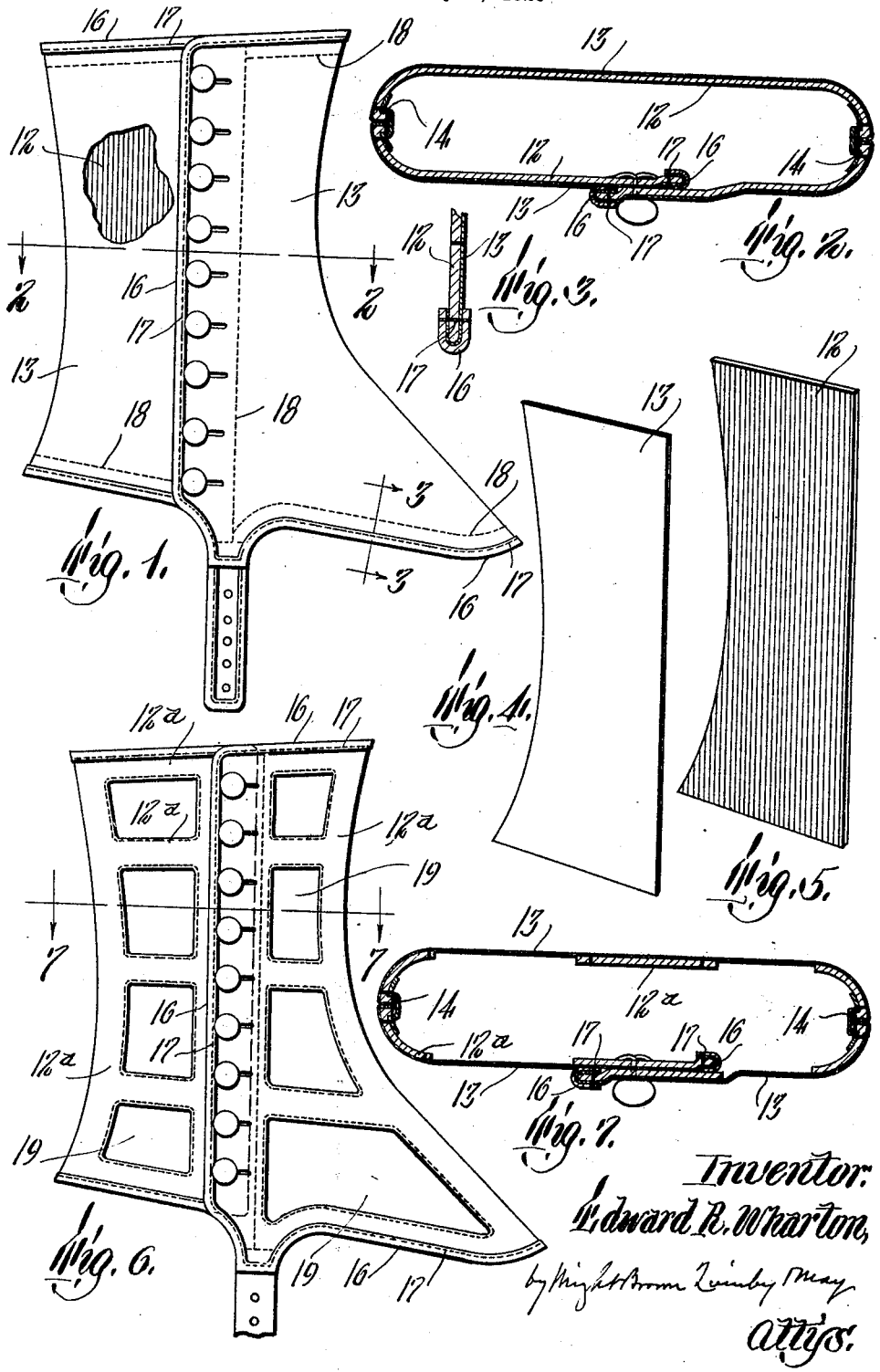

Patented Mar. 2, 1926.

1,574,773

UNITED STATES PATENT OFFICE.

EDWARD R. WHARTON, OF MEDFORD, MASSACHUSETTS.

WATERPROOF GAITER.

Application filed July 2, 1925. Serial No. 41,020.

*To all whom it may concern:*

Be it known that I, EDWARD R. WHARTON, citizen of the United States, residing at Medford, in the county of Middlesex and State of Massachusetts, have invented new and useful Improvements in Waterproof Gaiters, of which the following is a specification.

The object of this invention is to provide a gaiter or spat which, without being undesirably thick, stiff and heavy, has an external surface which is impervious to water.

I attain this and other related objects by the improved construction hereinafter described.

Of the accompanying drawings forming a part of this specification,—

Figure 1 is a side view of a gaiter embodying the invention, a portion of one of the outer layers hereinafter described being broken away.

Figure 2 is an enlarged section on line 2—2 of Figure 1.

Figure 3 is an enlarged fragmentary section on line 3—3 of Figure 1.

Figures 4 and 5 are perspective views showing the layers of which one of the parts shown by Figure 1 is made.

Figure 6 is a side view of a differently formed gaiter embodying the invention.

Figure 7 is a section on line 7—7 of Figure 6.

The same reference characters indicate the same parts in all of the figures.

It will be understood that an article in which my invention hereinafter described, is embodied, may be either a gaiter or a spat. For the sake of brevity, I will call it a gaiter in the following description and claims.

My improved gaiter comprises a plurality of laminated parts fashioned and united to form a gaiter of any desired general shape. The layers of one of the parts are shown separately by Figures 4 and 5.

Each of said parts includes a relatively stiff inner layer 12 which may be of leather, cloth, or other material, and an outer layer 13 of limp waterproof material, preferably the material known as oiled China silk extensively used as the material of light-weight raincoats or slickers. This material is thin and extremely flexible, has a glossy surface, is impervious to water, and is practically transparent, so that the color of a layer on which it is superimposed may be readily discerned through it.

In saying that the inner layer is relatively stiff, I mean that it is much less limp than the outer layer, and that a gaiter body composed of a plurality of the inner layers 12 has sufficient stiffness to enable it to conform without objectionable wrinkling or sagging to foot, ankle, and leg portions, and to maintain a covering or veneer, composed of a plurality of the limp outer layers 13 in approximately the form of a gaiter.

The outer layers 13 are coextensive with and superimposed on the inner layers 12. The laminated parts formed by said layers have meeting edges and marginal edges. The meeting edges are united to each other to form a gaiter and secure the outer layers to the inner layers at the meeting edges. In this instance the meeting edges are at the back and front of the gaiter as indicated by Figure 2, and the parts are turned inward at the meeting edges and united by stitches 14 passing through the inwardly turned portions of each layer, the outer layers 13 of the united parts meeting to prevent the entrance of water at the seams.

The outer layers 13 are united to the inner layers 12 at the marginal edges of the gaiter, these being the top and bottom edges and the side edges, one of which is overlapped by the other. In this instance, the marginal edges are provided with binding strips 16 and united by stitches 17 passing through the binding strips and the inner and outer layers as shown by Figure 3. The inner layers collectively constitute a form-maintaining body portion, while the outer layers collectively constitute a continuous waterproof veneer backed and maintained in gaiter form by the body portion. By this I mean that the gaiter when not in use approximates the form it is caused to assume when in use, and has sufficient stability or stiffness to enable it to be conveniently manipulated.

The veneer formed by the outer layers is so secured to the body portion by the stitches 14 and 17, that it is caused to conform closely to the body portion. Additional stitches 18 may be employed to unite the layers along other lines as shown by Figure 1. It will be seen that a veneer of material such as oiled China silk, does not add appreciably to the weight of the gaiter, and prevents access of water from the exterior to the body portion and to the wearer's stocking or sock.

The inner layers may be of skeleton form and composed of strips or bars 12ª (Figure 6), so that the body portion formed thereby has sight openings 19 through which portions of the wearer's stocking may be visible, the veneer when made of oiled silk being practically transparent. The body portion when not of skeleton form may be colored or ornamented in any desired way, the ornamentation being visible through the veneer. The glossy surface of oiled silk renders this material additionally desirable because of its appearance and of the ease with which mud may be removed therefrom.

Although I have specified oiled China silk as the best material known to me for the outer layers, I am not necessarily limited thereto.

I claim:

1. A waterproof article of the character stated, comprising a plurality of laminated parts each including a relatively stiff inner layer and an outer layer of limp waterproof material coextensive with and superimposed on the inner layer, said parts having meeting edges and marginal edges, the meeting edges being united to each other to form a gaiter and secure the outer layers to the inner layers at the meeting edges, the outer layers being united to the inner layers at the marginal edges, the inner layers collectively constituting a form-maintaining body portion, while the outer layers collectively constitute a continuous waterproof veneer backed and maintained in gaiter form by the body portion.

2. A waterproof article as specified by claim 1, the body portion being of skeleton form and provided with sight openings, the material of the said veneer being transparent so that portions of stockings, within the gaiter, are visible through the sight openings.

In testimony whereof I have affixed my signature.

EDWARD R. WHARTON.